Jan. 24, 1967  G. D. ROCKEFELLER, JR., ETAL  3,300,648
LOAD COMPUTING AND SHEDDING APPARATUS
Filed Aug. 15, 1963
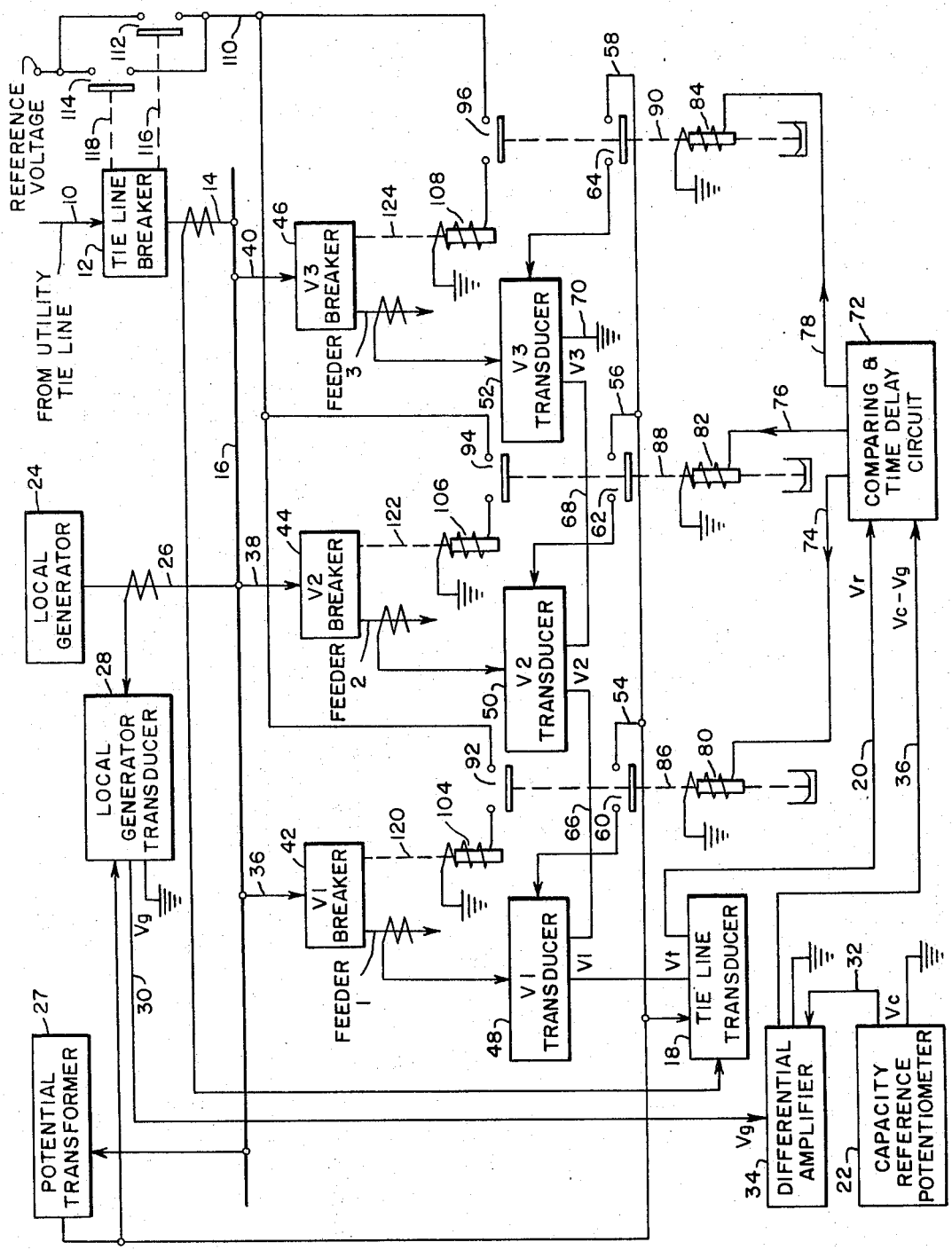
WITNESSES:
Bernard R. Gregney
James F. Young
INVENTORS
George D. Rockefeller, Jr. &
John C. Gambale.
BY
Samuel Hi

United States Patent Office 3,300,648
Patented Jan. 24, 1967

3,300,648
LOAD COMPUTING AND SHEDDING APPARATUS
George D. Rockefeller, Jr., Morris Plains, and John C. Gambale, Livingston, N.J., assignors to Westinghouse Electric Corporation, Pittsburgh, Pa., a corporation of Pennsylvania
Filed Aug. 15, 1963, Ser. No. 302,415
6 Claims. (Cl. 307—29)

The present invention relates to load computing and shedding apparatus, and more particularly to load computing and shedding apparatus for selectively and preferentially dropping loads in case of utility power interruption.

When industrial or municipal users maintain their own electrical generating equipment to supply a portion of their overall power requirements, the remainder being supplied by a utility, it is desirable and often necessary that protective equipment be supplied to drop certain designated loads from the user's system. With the user's local generating equipment being connected in parallel with that of the utility in case of utility power interruption, this will necessitate that some of the local feeder lines be dropped from the system in order to protect the local generating equipment from overload which might cause damage to the equipment and cause a complete power failure in the local system. Moreover, it would be highly desirable to permit the selective shedding of feeder lines from the local system by the preferential designation of the various feeder lines. That is, the least important feeder lines of the system would be dropped. For example, in a municipality having some local generating capacity, if a utility power interruption should occur, it would be preferable to continue to supply power to hospitals, while permitting residential loads to be dropped from the system. Similarly, industrial users would find it very advantageous to drop lighting, heating or cooling equipment from their local system, rather than have equipment of higher preferences, such as that controlling processes shed from the system, which could be very damaging perhaps to personnel and equipment, as well as result in expensive loss of production. Moreover, because of rapid frequency decay due to overload conditions, it is necessary that excess loads be shed very rapidly.

It would thus be ideal for users having some local generating equipment to be able to designate preferentially which loads could be shed with the least disadvantage in case of utility power failure and to be able to shed these loads quickly while still having some generating capacity to supply high priority loads that would be essential to the community or industrial facility. However, in order to provide an indication of how much and which loads should be dropped from a local system, it is necessary to measure power flows to compute the actual excess of capacity that the local generating equipment can pick up in case of interruption of utility power.

It is therefore an object of the present invention to provide new and improved load computing and shedding appartus.

It is a further object of the present invention to provide new and improved load computing and load shedding apparatus capable of dropping loads immediately in a preferential manner while still providing power to essential loads of a local system.

It is a further object of the present invention to provide new and improved load computing and shedding apparatus in which the comparison of the actual loads being carried in the local system and the excess power capacity that can be supplied by the local generator in case of utility power interruption is done selectively and with a minimum of equipment.

The above cited objects are generally accomplished by providing computing and shedding apparatus in which the loads being carried by individual circuits, which are designated preferentially, are compared selectively with the amount of power that would have to be shed from the local system in case of external power interruption. The comparison operation provides a continuous cycle of comparison and presetting of the circuits so that if an external power interruption should occur the preset circuits would be dropped in a preferential manner from the local system.

These and other objects and advantages of the present invention will become apparent when considered in view of the following specification and drawing, in which:

The single figure is a schematic-block diagram of the load computing and shedding apparatus of the present invention.

Referring now to the single figure, power is supplied into the local systems, as shown, from the utility tie line input 10. A tie line breaker 12 is provided to permit power to pass from the utility system 10 to local system bus 16. The tie line breaker 12 is usually in a closed position to permit power to pass from the tie line 10 to the local system bus 16. However, the tie line breaker 12 will be opened in case of a tie line failure and also the tie line breaker may be opened manually. To measure the power being supplied by the utility tie line, a tie line transducer 18 is provided which is coupled to the output connection 14 for its current input and to a potential transformer 27 for its voltage input. The potential transformer is connected to the local system bus 16. The output of the tie line transducer 18 is an indication of the tie line power. The tie line transducer 18, for example, may be a watt transducer having a voltage output $V_t$, as indicated, between the output leads 20 and 22.

A local generator 24 supplies power to the local system bus 16 through the output connection 26. Other local generators may also be in the system; however, only one is shown here for purposes of clarity. A local generator transducer 28 is coupled to a local generator output bus 26 connected to the local system bus 16 to receive an indication of the current supplied by the local generator 24. The potential transformer 27, connected to the bus 16, supplies the voltage input to the transducer 28. The output of the local generator transducer 28 appearing at the terminal 30 is an analog voltage $V_g$, with respect to ground, proportional to the power supplied by the local generator 24. A capacity reference potentiometer 32 supplies an analog output signal $V_c$ at the terminal 32, with respect to ground. The output signal $V_c$ indicates the maximum safe capacity of power that the local generator 24 can supply continuously without damage.

A differential amplifier 34 is provided to receive as input signals $V_g$, indicative of the power being supplied by the local generator 24, and the capacity signal $V_c$, indicative of the capacity for supplying power of the local generator 24. At the output 36 of the differential amplifier 34 is provided the difference signal $V_c - V_g$, which indicates the excess power that can be picked up by the local generator in case this would be required. The difference signal could also be obtained by a series connection without the differential amplifier 34.

Three feeder lines, feeders 1, 2 and 3 are shown being fed from the local system bus 16. Input connections 36, 38 and 40 lead from the local system bus 16 to V1 breaker 42, V2 breaker 44 and V3 breaker 46, respectively. The breakers 42, 44 and 46 when closed permit power to pass from the local system bus 16 through to the respective feeders 1, 2 and 3. The various feeder lines are designated preferentially so that feeder 1 carries the highest priority load to be shed in case of a utility tie line interruption. The feeder 2 is next to be shed and the feeder 3 is the last to be shed, being a critical load that is to be carried as long as possible.

To provide an indication of the power or load being carried by each of the feeders 1, 2 and 3 a V1 transducer 48, a V2 transducer 50 and a V3 transducer 52 are provided and are coupled, for example inductively, to the respective feeders 1, 2 and 3 to provide a current input and also coupled to the potential transformer 27 to provide a voltage input. The transducers 48, 50 and 52 may be similar to the tie line transducer 18 and the local generator transducer 28 and may, for example, be watt tranducers. Connected in the voltage input leads 54, 56 and 58 of the V1 transducer, V2 transducer and V3 transducer, respectively, are the contacts 60, 62 and 64. The contacts 60, 62 and 64 are shown in their open position. When these contacts are closed they permit an indication of the power flowing in the respective feeder lines to be provided to the V1, V2 and V3 transducers, which in turn provide an analog voltage signal V1, V2 or V3 indicative of the power or load being carried by the respective feeders 1, 2 and 3.

The V1, V2 and V3 transducers 48, 50 and 52 have their respective outputs connected in series, that is, a lead 66 connects the V1 transducer 48 with the V2 transducer 50, and a lead 68 connects the V2 transducer 50 to the V3 transducer 52, with the other output lead 70 of the V3 transducer 52 being grounded. The tie line transducer 18 is connected in series with the V1, V2 and V3 transducers by the lead 22 being connected between the tie line transducer 18 and the V1 transducer 48. The voltage V1 is indicative of the load being carried by the feeder 1 and appears between lead 22 and 66. The voltage V2 is indicative of the load being carried by the feeder 2 and appears between the lead 66 and the lead 68. The voltage V3 indicative of the load being carried by the feeder 3 appears between the lead 68 and the lead 70. The tie line transducer 18 and the V1, V2 and V3 transducers 48, 50 and 52 are so arranged in series that the output $Vt$ of the tie line transducer 18 is subtracted from the sum of the V1, V2 and V3 transducers that happen to be in the circuit at any given time to give a signal $Vr$. This is according to the equation:

$$Vr = Vt - Vn$$

where $Vn = V1$, or $V1+V2$, or $V1+V2+V3$, depending upon which of the transducers 48, 50 or 52 happen to have their respective contacts 60, 62 and 64 closed at a given period of time.

It should be noted that the magnitude of load $Vs$ that must be shed if there is a utility tie line interruption may be defined by the equation:

$$Vs = Vt - (Vc - Vg)$$

It then can be seen that if a tie line interruption should occur, if the value of $Vs$, the amount of load that must be dropped in case of tie line interruption, is positive then feeder 1 must be dropped from the local system; if $Vs$ is greater than V1 then feeder 2 must also be dropped from the circuit; and if $Vs$ is greater than $V1+V2$ then feeder 3 must also be dropped from the local system.

A comparing and time delay circuit 72 is provided to receive the signal $Vr$ as one input and the difference signal $Vc - Vg$ as the other input signal. The comparing and time delay circuit 72 may be a bistable circuit which will change operating states depending upon the relative magnitude of its input signals and will delay the appearance of an output signal a predetermined time period. In the present case the comparing circuit 72 is such that if the input signal $Vr$ is greater than the input signal $Vc - Vg$, then the comparing circuit 72 will provide an output signal at one of its output leads 74 and 76 and/or 78. A preset coil 80 is connected between the lead 74 and ground. A preset coil 82 is connected between the lead 76 and ground and a preset coil 84 is connected between the lead 78 and ground.

When the comparing and time delay circuit 72 provides an output signal at any of the leads 74, 76 or 78, the respective coil 80, 82 or 84 is energized by conductive paths being provided from the comparing circuit through the coil to ground. The coils 80, 82 and 84 are shown by the dotted lines 86, 88 and 90 to be mechanically connected to the contacts 60, 62 and 64, respectively. Preset contacts 92, 94 and 96 are, respectively, connected to the preset coils 80, 82 and 84 through the mechanical connections shown by dotted lines 98, 100 and 102. The preset contacts are closed when the associated coils 80, 82 or 84 are energized and serve to provide an indication of which feeder line is to be dropped in case of power line interruption, which will subsequently by explained.

Connected in series with the contacts 92, 94 and 96 are breaker trip coils 104, 106 and 108, respectively. Interrupting contacts usually placed in series with trip coils are not shown here for purposes of clarity. The series combination of the preset contacts and trip coils are connected in parallel with one end of the parallel combination being grounded and the other end connected through a lead 110 to a parallel combination of contacts 112 and 114. The other end of the parallel combination of contacts 112 and 114 is connected to a tripping reference supply voltage, usually D.C., not shown. The contacts 112 are fault sensing contacts of the system. When a fault occurs on the utility tie line, this set of contacts is closed to provide a conductive path between the reference source to the lead 110. By the closure of the contacts 112, the tie line breaker 12 is tripped to open and block passage of power thereto. A mechanical connection 116 is shown by the dotted line between the reverse power contacts 112 and the tie line breaker 12. The other set of contacts 114 is an auxiliary set of contacts which are in an open position when the tie line breaker is closed and in a closed position when the tie line breaker is open. Should the tie line breaker 12 open due to a failure on the utility tie line or due to the manual opening of the tie line breaker 12, the contacts 114 will close. The contacts 114 are connected mechanically to the tie line breaker 12 as shown by the dotted line 118.

A mechanical connection is shown by the dotted lines 120, 122 and 124 between the trip coils 104, 106 and 108, respectively. Upon energization of the trip coils 104, 106 and 108, the respective V1 breaker 42, V2 breaker 44 or V3 breaker 46 will be tripped to drop the respective feeder 1, 2 or 3 from the local system.

An example may now serve to better explain the operation of the present load computing and shedding apparatus. Assume initially that the position of all the contacts are as shown in their open position and that all the breakers are closed to permit power to be supplied to each of the feeders 1, 2 and 3. The signals then applied to the comparing circuit 72 are then $Vc - Vg$ and $Vr$, which at this time is equal to $Vt$, the output of the tie line transducer 18, since the contacts 60, 62 and 64 are open and do not permit any output to appear from the transducers 48, 50 and 52, associated with the respective feeders 1, 2 and 3. If $Vr = Vt$ is smaller than $Vc - Vg$, the comparing and time delay circuit 72 will provide an output signal on the lead 74 to energize the control coil 80. In other words, if the value of the shedding signal $Vs$ is greater than zero an output signal will be provided by the comparing and time delay circuit 72 to energize the coil 80. After a given time delay, as determined by time constants within the comparing and time delay circuit 72, the coil 80 is energized and the contacts 60 in the input of the V1 transducer 48 are closed to permit the V1 transducer to have an output V1 indicative of the load being carried by the feeder 1. Also the energization of the coil 80 causes the contacts 92 to close, presetting these contacts to indicate feeder 1 must be dropped in case of utility tie line failure.

With the contacts 60 being closed, the output of the transducer V1 will be subtracted from the output $Vt$ of tie line transducer 18, so that $Vr$ is now equal to $Vt-V1$. This value is then compared with $Vc-Vg$ in comparing and time delay circuit 72. If $Vt-V1=Vr$ is smaller than $Vc-Vg$, an output signal is provided on the lead 76 after a predetermined time delay, as determined in the comparing and time delay circuit 72. In oter words, if $Vs$ is greater than the signal V1, an output signal now will also be provided at the lead 76 to energize the preset coil 82. The coil 80 remains energized. The energization of the preset coil 82 will cause the contacts 62 in the input of the V2 transducer 50 to close and provide an output V2. The trip coil 82 also causes the reset contacts 94 to close, indicating that the feeder 2 must be dropped in case of utility power failure. With contacts 60 and 62 being closed, the value of $Vr$ is now equal to $Vt-(V1+V2)$ The signals to be compared in the comparing and timing circuit 72 now are $Vr$, which is equal to $Vt-(V1+V2)$ and $Vc-Vg$ If now $Vr$ is smaller than $Vc-Vg$, an output signal would be provided on the lead 78 after a predetermined time limit. However, let us assume for purposes of example that $Vc-Vg$ is smaller than $Vr$. Under these conditions no output signals will be provided on lead 78. Thus, the preset coil 84 will not be energized and the contacts 96 will remain in their open position. Since, however, $Vc-Vg$ is larger than $Vt$ and $Vt-V1$, coils 80 and 82 will remain energized, with coils 80 and 82 presetting the contacts 92 and 94, respectively.

If now a failure should occur on the utility tie line, the fault sensing contacts 112 will close due to this failure. This will cause the tie line breaker 12 to open and block power from passing therethrough to the local system bus 16. The closure of the contacts 112 will provide a circuit from the reference voltage, through the contacts 112, to the lead 110, and since the contacts 92 and 94 have been preset closed, through the trip coils 104 and 106. The energization of the trip coil 104 will cause the V1 breaker 42 to trip due to the mechanical connection 120 between the trip coil 104 and the V1 breaker 42. The energization of trip coil 106 will also cause the V2 breaker 44 to trip open due to the mechanical connection 122 between the coil 106 and the V2 breaker 44. This will cause the breakers 42 and 44 to open and thus shed the loads on feeder 1 and feeder 2. However, since the contacts 96 are still open, the coil 108 will not be energized; thus, the V3 breaker 46 will remain closed and will permit power to be transmitted to the load carrier in feeder 3. Feeder 3 being the most critical will remain in the circuit even though the loads carried on feeders 1 and 2 are dropped.

Should there be no external failure on the utility tie line but the tie line breaker 12 should be opened for some other reason, the auxiliary contacts 114 would close to provide a conductive path from the reference voltage, through the contacts 114, the lead 110 and the preset contacts 92 and 96, to energize the respective coils and trip the respective breakers. This would permit the opening of the tie line breaker 12 for inspection or due to accident without damaging of the local generating equipment or dropping all critical loads.

Under changed load or generating conditions, it might be necessary that the feeder 3 be dropped in case of a utility tie line interruption. This would require that the contact 96 be preset, which would occur when $Vs$ would be greater than $V1+V2$. Under these conditions the comparing and timing circuit 72 would supply an output on the lead 79 also to energize the coil 108. The V3 transducer 52 is only required if there are other feeder lines of lower priority than feeder 3, or if the priorities of the narrow feeder might be changed from time to time.

If, however, the magnitude of the load to be shed should drop, meaning that some of the feeders need not be shed, the comparing process would go on causing no output to appear on the leads 78, 76 or 74, in that order, so that their respective coils 108, 106, 104, would not be energized and thus the preset contacts 96, 94, 92, and the input contacts 64, 62, 60 to the V3, V2 and V1 transducers would be opened as changed load conditions demand.

Although the present invention has been described with a certain degree of particularity, it should be understood that the present disclosure has been made only by way of example and numerous changes in the details of construction and combination and arrangement of parts may be resorted to without departing from the scope and the spirit of the present invention.

We claim as our invention:

1. In load computing and shedding apparatus for use in a local system receiving power from external and internal generating sources and operative to drop circuits from the local system in case of external power interruption, the combination of: external transducer means for providing external signals indicative of the power being supplied externally; local generator transducer means for providing local signals indicative of the power being supplied locally; reference means for providing reference signals indicative of the local power supplying capacity; a circuit transducer means for providing load signals indicative of the load being carried by each of a plurality of feeder lines designated preferentially in the order to be shed in case of external power interruption; switch means selectively operative to permit said circuit transducer means to provide said load signals in response to preset signals; differencing means for providing difference signals of said external signals and the sum of selected of said load signals; comparing means to compare the difference of said reference signals and said local signals with said difference signals and provide said preset signals when said signals compared in said comparing means are of a predetermined relationship to each other; preset means to provide an indication of which circuits are to be shed in case of external power interruption in response to said preset signals; and interruption means to drop the indicated circuits from the local system when an external power interruption occurs.

2. In load computing and shedding apparatus for use in a local system receiving power from external and internal generating sources and operative to drop circuits from the local system in case of external power interruption, the combination of: external transducer means for providing external signals indicative of the power being supplied externally; local generator transducer means for providing local signals indicative of the power being supplied locally; reference means for providing reference signals indicative of the local power supplying capacity; circuit transducer means for providing load signals indicative of the load being carried respectively by each of a plurality of circuits designated preferentially in the order to be shed in case of external power interruption; input switch means selectively operative to permit said circuit transducer means to provide said load signals in response to preset signals; differencing means operatively connected to said external transducer means and said feeder transducer means to provide difference signals of said external signals and the sum of selected of said load signals; comparing means to compare the difference of said reference signals and said local signals with said difference signals and provide said preset signals when said signals compared in said comparing means are of a predetermined relationship to each other; preset means to provide an indication of which circuits are to be shed in case of external power interruption in response to said preset signals; and interruption means to drop the indicated feeder lines from the local system when a utility tie line interruption occurs.

3. In a load computing and shedding apparatus for use in a local system receiving power from external and internal generating sources and operative to drop feeder lines from the local system in case of external power interruption, the combination of: external transducer means for providing external signals indicative of the power being supplied externally; local generator transducer means for providing local signals indicative of the power being supplied locally; reference means for providing reference signals indicative of the local power supplying capacity; a plurality of feeder transducer means each having input and output terminals for providing feeder signals at the output terminals indicative of the load being carried respectively by each of a plurality of feeder lines designated preferentially in the order to be shed in case of external power interruption; input switch means operatively connected to the input terminals of each of said feeder transducer means and being selectively operative to permit said feeder transducer means to provide said feeder signals in response to preset signals; circuit means operatively connecting the output terminals of said feeder transducer means in series; differencing means operatively connecting said external transducer means and said circuit means to provide difference signals of said external signals and one of said feeder signals plus the sum of all feeder signals of higher preferences to be shed in case of external power interruption; comparing means to compare the difference of said reference signals and said local signals with said difference signals and provide said preset signals when the amount of the load required to be shed in case of external power interruption is greater than the sum of the selected feeder signals; preset means to provide an indication of which feeder lines are to be shed in case of utility tie line interruption in response to said preset signals; and interruption means to drop the indicated feeder lines from the local system when an external power interruption occurs.

4. In load computing shedding apparatus for use in a local system receiving power externally from a utility tie line and internally from a local generator and operative to drop feeder lines from the local system in case of interruption of the utility tie line, the combination of: tie line transducer means for providing tie line signals indicative of the power being supplied externally from the utility tie lines; local generator transducer means for providing local signals indicative of the power being supplied locally by the local generator; reference means for providing reference signals indicative of the power supplying capacity of the local generator; a plurality of feeder transducer means for providing feeder signals indicative of the load being carried respectively by each of a plurality of feeder lines designated preferentially in the order to be shed in case of utility tie line interruption; switch means selectively operative to permit said feeder transducer means to provide said feeder signals in response to preset signals; differencing means operatively connected to said tie line transducer means and each of said plurality of feeder transducer means to provide difference signals of said tie line signals and the sum of selected of said feeder signals; comparing means to compare the difference of said reference signals and said local signals with said difference signals and provide said preset signals when said signals compared in said comparing means are of a predetermined relationship to each other; preset means to provide an indication of which feeder lines are to be shed in case of utility tie line interruption in response to said preset signals; and interruption means to drop the indicated feeder lines from the local system when a utility tie line interruption occurs.

5. In load computing shedding apparatus for use in a local system receiving power from external and internal generating sources and operative to drop feeder lines from the local system in case of external power interruption, the combination of: external transducer means for providing external signals indicative of the power being supplied externally; local generator transducer means for providing local signals indicative of the power being supplied locally; reference means for providing reference signals indicative of the local power supplying capacity; a plurality of feeder transducer means for providing feeder signals indicative of the load being carried respectively by each of a plurality of feeder lines designated preferentially in the order to be shed in case of utility tie line interruption, said feeder transducer means being operatively connected to each other in series so that the respective feeder signals will add; input switch means selectively operative to permit said feeder means to provide their respective feeder signals in response to preset signals; differencing means operatively connected to said external transducer means and said plurality of feeder transducer means to provide difference signals of said external signals and one of said feeder signals plus the sum of all feeder signals of higher preference to be shed in case of utility tie line interruption; comparing means to compare the difference of said reference signals and said local signals with said difference signals and provide said preset signals when said signals compared in said comparing means are of a predetermined relationship to each other; preset means to provide an indication of which feeder lines are to be shed in case of external power interruption in response to said preset signals; and interruption means to drop the indicated feeder lines from the local system when a utility tie line interruption occurs.

6. In load computing and shedding apparatus for use in a local system receiving power externally from a utility tie line and internally from a local generator and operative to drop feeder lines from the local system in case of interruption of the utility tie line, the combination of: tie line transducer means for providing tie line signals indicative of the power beng supplied externally from the utility tie line; local generator transducer means for providing local signals indicative of the power being supplied locally by the local generator; reference means for providing reference signals indicative of the power supplying capacity of the local generator; a plurality of feeder transducer means each having input and output terminals for providing feeder signals indicative of the load being carried respectively by each of a plurality of feeder lines designated preferentially in the order to be shed in case of utility tie line interruption; input switch means connected to the input terminals of each of said feeder transducer means and being selectively operative to permit said feeder transducer means to provide said feeder signals in response to preset signals; circuit means connecting the output terminals of said feeder transducer means in a series circuit relationship so that the feeder signals appearing at the output terminals will be added; differencing means connected to said tie line transducer means and said circuit means to provide difference signals of said tie line signals and one of said feeder signals plus the sum of all feeder signals of higher priority to be shed in case of utility tie line interruption, comparing means to compare the difference of said reference signals and said local signals with said difference signals and provide said preset signals when the amount of load required to be shed in case of utility tie line interruption is larger than the sum of the feeder signals being subtracted from said tie line signals; preset means to provide an indication of which feeder lines are to be shed in case of utility tie line interruption in response to said preset signals; and interruption means to drop the indicated feeder lines from the local system when a utility tie line interruption occurs.

No references cited.

ORIS L. RADER, *Primary Examiner.*

T. J. MADDEN, *Assistant Examiner.*